United States Patent [19]
Mikami

[11] 3,722,979
[45] Mar. 27, 1973

[54] OPTICAL SYSTEM OF THE REAL IMAGE TYPE FOR FINDERS HAVING ASPHERIC SURFACES

[75] Inventor: Nobunao Mikami, Yokohama, Japan

[73] Assignee: Kabushiki Kaisha Ricoh, Tokyo, Japan

[22] Filed: May 27, 1971

[21] Appl. No.: 147,532

[30] Foreign Application Priority Data

June 1, 1970 Japan .................................45/47405

[52] U.S. Cl. .....................350/54, 350/189, 350/192
[51] Int. Cl. ...............................................G02b 23/00
[58] Field of Search..................350/54, 45, 189, 192

[56] References Cited

UNITED STATES PATENTS 3,583,785  6/1971  Boardman ..............................350/54

3,466,111  9/1969  Ring ........................................350/54

FOREIGN PATENTS OR APPLICATIONS 606,065  8/1948  Great Britain........................350/189

OTHER PUBLICATIONS

Rumsey "A Skylens for an Auroral Spectrograph" Optica Acta Vol. 8, No. 1 Jan. 1961, pp. 17–19.

Primary Examiner—John K. Corbin
Attorney—John J. McGlew and Alfred E. Page

[57] ABSTRACT

A finder optical system of the real image type comprises four identical non-spherical lenses arranged on a single common optical axis and constituting, in the direction of incident light rays therethrough, an objective lens, a front lens of an erecting lens system, a rear lens of the erecting lens system, and an eyepiece. A small diaphragm may be arranged between the front and rear lenses of the erecting lens system, or at another selected location along the optical axis.

2 Claims, 7 Drawing Figures

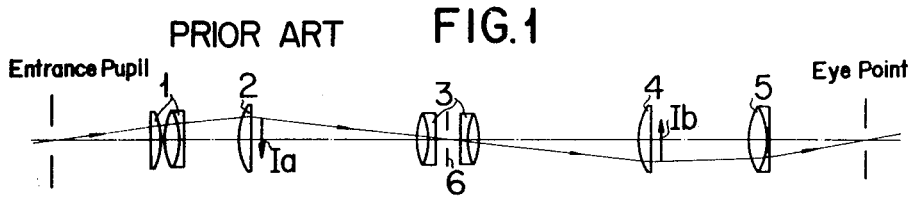
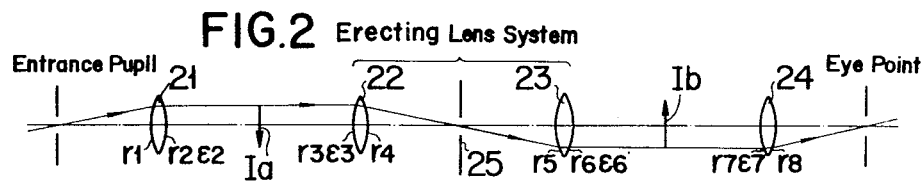
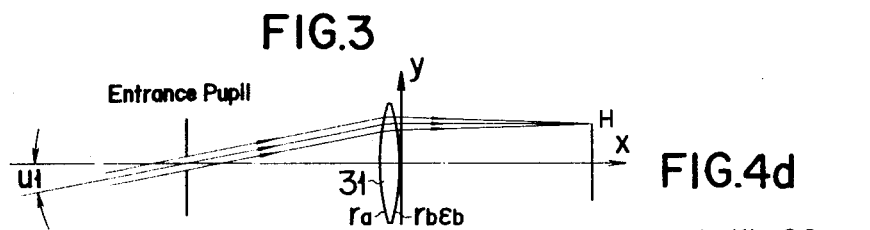
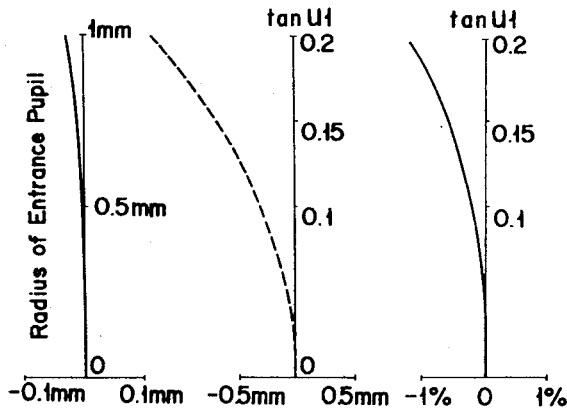
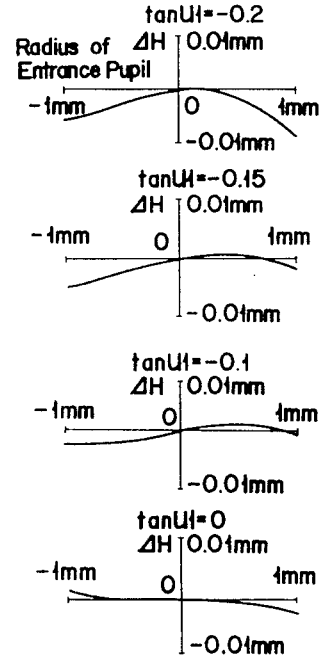

OPTICAL SYSTEM OF THE REAL IMAGE TYPE FOR FINDERS HAVING ASPHERIC SURFACES

BACKGROUND OF THE INVENTION

A conventional prior art finder optical system, of the real image type, is illustrated in FIG. 1 as comprising an objective lens 1, a condenser lens 2, a relay or erector lens system 3, a condenser lens 4, an eyepiece 5 and a diaphragm 6. Light entering through the entrance pupil is incident upon objective lens 1 which forms an inverted image 1a of the subject, and this inverted image is converted into a real or erected image 1b by erector lens 3. The erected image 1b is enlarged by eyepiece 5 at the eye point.

Such a conventional finder optical system, of the real image type, requires about ten lenses, or more, as will be clear from FIG. 1. Consequently, it has the disadvantages that it is hard to assemble and is high in cost.

SUMMARY OF THE INVENTION

This invention relates to finder optical systems of the real image type, such as used with photographic still or movie cameras, and, more particularly, to a novel, simplified, improved and less expensive finder optical system of the real image type.

The objective of the invention is to provide a finder optical system of the real image type which comprises four lenses of the same material and having identical shapes, is highly efficient and economical, and has a performance at least equal to that of conventional finder optical systems of the real image type.

In accordance with the invention, the so-called condenser lenses, used in conventional finder optical systems of the real image type and disposed in proximity to two focal planes are eliminated, thereby reducing the number of lenses required for the optical system. Conventional finder optical systems of the real image type, including such condenser lenses, have had the disadvantage that dust on the surfaces of the condenser lenses, or scratches formed in the surfaces, are conspicuous. This disadvantage is obviated by the present invention, because the finder optical system of the present invention does not include any condenser lenses.

As mentioned, the finder optical system of the real image type in accordance with the invention has a number of lenses which is less than the number of lenses in conventional finder optical systems of the real image type. For example, the number of lenses in the finder optical system of the present invention is less, by two lenses, than the number of lenses in the finder optical system described in published German Pat. Application No. 1,422,735, which comprises six plastic lenses.

In addition, the finder optical system of the real image type in accordance with the invention is symmetrical in shape, and the incident light flux is incident, on the objective lens, under conditions which are identical with the exit light flux emerging from the eyepiece. This permits minimizing various aberrations, particularly coma, magnification chromatic aberration, and distortion aberration, so these aberrations are negligible from the practical standpoint.

The lenses of the finder optical system, of the real image type, embodying the invention have identical shapes and equal outside diameters. By using a plastic composition material as the lens material, it is possible to produce, at low cost and on a mass production basis, a large number of lenses, in the form of non-spherical plastic composition lenses, by molding, requiring only manufacture of a metal mold for non-spherical lenses before hand. If the lens frame is formed by molding with the lenses, it is possible to assemble readily four lenses with high accuracy and precision, to form the finder optical system of the invention. The reduction in the number of lenses used, relative to those used in conventional finder optical systems of the real image type, is highly conducive to increased transparency.

An object of the invention is to provide an improved and simplified finder optical system of the real image type.

Another object of the invention is to provide such a finder optical system which includes only four identical non-spherical lenses.

A further object of the invention is to provide such a finder optical system which is characterized by reduced cost, greater transparency, higher efficiency and less aberration than conventional finder optical systems of the real image type.

For an understanding of the principles of the invention, reference is made to the following description of a typical embodiment thereof as illustrated in the accompanying drawing.

BRIEF DESCRIPTION OF THE DRAWING

In the drawing:

FIG. 1 is a schematic illustration of a known or conventional finder optical system of the real image type, representing the prior art;

FIG. 2 is a view, similar to FIG. 1, illustrating a finder optical system, of the real image type, embodying the invention;

FIG. 3 is a schematic illustration of the optical path and the light rays passing through one of the lenses included in the finder optical system of the invention; and FIGS. 4a through 4d are graphical illustrations of the aberration of the lens shown in FIG. 3 with respect to the index of refraction for the d line.

DESCRIPTION OF THE PREFERRED EMBODIMENT

The finder optical system of the real image type embodying the invention will be explained as if it were used as the finder of a movie camera, particularly an 8 mm movie camera. In many 8 mm movie cameras, the master lens of the taking lens system has a focal length ranging from 15 to 20 mm, and the distance between the rear surface of the eyepiece and the eyepoint is set at 15 to 20 mm.

If the same lens system is used as an objective lens 21 and an eyepiece 24, with lenses 22 and 23 of an erecting lens system being disposed centrally or midway as shown in FIG. 2, so that the lenses are arranged symmetrically, the incident height and the incident angle at which the incident light flux, entering the finder, is incident on the objective lens 21, and the emergence height and the emergence angle at which the emerging light flux emerges from eyepiece 24, are symmetrical, when the magnification of the finder optical system is 1. Because of the characteristics inherent in this perfect symmetry, the finder optical system embodying the invention has minimized coma, magnification chromatic aberration, and distortion.

Referring to FIG. 3, a lens element 31 of the finder optical system of the real image type embodying the invention has a construction and configuration such that all the main light rays incident on the lens element through an entrance pupil disposed in front of the lens element emerge from the lens element substantially parallel to the optical axis thereof. Four lens elements of the type shown in FIG. 3, arranged in combination, constitute a finder optical system of the real image type embodying the invention.

The phenomenon mentioned with respect to lens element 31 generally occurs when the entrance pupil is disposed at a position corresponding to the front focus of lens element 31. If the lens elements were conventional spherical single lenses, the light flux emerging from the lens system would have high aberration, so that, as a result, such a lens system would be impractical.

However, in the present invention, the lens elements 31 have their front and rear surfaces formed as non-spherical surfaces constituted by a hyperboloid of revolution, and by suitably selecting the respective radii of curvature of the front and rear surfaces in a manner described hereinafter. By using non-spherical lenses designed in the manner just mentioned, the finder optical system of the real image type in accordance with the invention is naturally adapted for practical use.

The aforementioned non-spherical surface is a surface of revolution of a secondary curved surface, obtained by rotating, about an $x$-axis which is the optical axis of lens 31, a secondary curved surface which can be expressed by the equation $y^2 = 2rx - \epsilon x^2$. In this equation, the apex of a second surface of the lens 31 is the origin of coordinates, the line passing through the origin perpendicular to the optical axis is the $y$-axis, as shown in FIG. 3, and $r$ is the radius of curvature at the optical axis $x$. The curved surface is a rotary elliptical surface when $\epsilon > 0$, is a rotary hyperboloid surface when $\epsilon < 0$, and is a rotary parabolic surface when $\epsilon = 0$. When $\epsilon = 1$, the curved surface is a spherical surface.

The pertinent characteristics of a single lens element 31 are as follows:

| | |
|---|---|
| Focal Length | 17.8 mm. |
| Entrance Pupil | 16.8 mm from the front of the objective lens. |
| Diameter of Entrance Pupil | 2 mm $\phi$. |
| Radius of Curvature | $r_a = 20$ mm. |
| | $r_b = -15$ mm, $\epsilon b = -1.9$. |
| Lens Thickness | $d = 2$ mm. |
| Refractive Index with Respect to the $d$ Line of Lens | $N = 1.4913$ |
| Abbe Number with Respect to the d Line of Lens | $V = 57.8$. |

Various characteristics or features of a lens element 31 having the parameters set forth in the above table are shown in FIGS. 4a through 4d. FIG. 4a diagrammatically represents the spherical aberration with respect to the index of refraction for the $d$ line, FIG. 4b diagrammatically represents the astigmatism, FIG. 4c diagrammatically represents the distortion aberration, and FIG. 4d diagrammatically represents the the meridional coma. The incident angle is represented by $u_1$. The hight of image is represented by H.

Four non-spherical single lenses, constructed as described for lens element 31, are arranged as shown in FIG. 2. A lens having the same parameters and facing in the same direction as the lens 31 of FIG. 3 is used as an objective lens 21, and a lens of the same construction as the lens element 31, but facing in the opposite direction, is used as the front lens 22 of the erecting lens system. A lens of the same parameters and construction as the lens element 31, and facing in the same direction, constitutes a rear lens 23 of the erecting lens system, and a lens of the same parameters as the lens 31 shown in FIG. 3, but facing in the opposite direction, constitutes an eyepiece 24. The lenses are arranged on a single common optical axis in spaced relation therealong, with the spacing between adjacent lenses corresponding to substantially twice the focal distances of the lenses. When the lenses are arranged in this manner, in which there is symmetry between the lenses 21 and 22, between the lenses 23 and 24, and between the lenses 21 and 22, as a group, and the lenses 23 and 24, as a group, the light flux incident on objective lens 21 and the light flux emerging from eyepiece 24 are symmetrical with respect to each other.

The parameters of a finder optical system of the real image type, in accordance with the invention, and being illustrative of one particular example, are as follows:

| | |
|---|---|
| Magnification of the Finder | 1 |
| Entrance Pupil | 16.8 mm from the front surface of the objective lens. |
| Diameter of Entrance Pupil | 2 mm $\phi$. |
| Eyepoint | 16.8 mm from the rear surface of the eyepiece |
| Radii of Curvature | $r_1$ to $r_8$ (Stated below). |
| Coefficients of the Secondary Rotary Curved Surface | $\epsilon 2, \epsilon 3, \epsilon 6, \epsilon 7$ (Stated below). |
| Distances between Lens Surfaces on the Optical Axis | $d_1$ to $d_7$ (Stated below). |
| Refractive Indexes of the Lenses with Respect to the d Line | $N_{21}$ to $N_{24}$ (Stated below). |
| Abbe Numbers of the Lenses with Respect to the $d$ Line | $V_{21}$ to $V_{24}$ (Stated below). |

| | | | | |
|---|---|---|---|---|
| $r_1 = 20$ mm | | $d_1 = 2$ mm | $N_{21} = 1.4913$ | $V_{21} = 57.8$ |
| $r_2 = -15,$ | $\epsilon_2 = -1.9$ | $d_2 = 34.2$ | | |
| $r_3 = 15,$ | $\epsilon_3 = -1.9$ | | | |
| $r_4 = -20$ | | $d_3 = 2$ | $N_{22} = 1.4913$ | $V_{22} = 57.8$ |
| | | $d_4 = 33.5$ | | |
| $r_5 = 20$ | | $d_5 = 2$ | $N_{23} = 1.4913$ | $V_{23} = 57.8$ |
| $r_6 = -15,$ | $\epsilon_6 = -1.9$ | $d_6 = 34.2$ | | |
| $r_7 = 15,$ | $\epsilon_7 = -1.9$ | | | |
| $r_8 = -20$ | | $d_7 = 2$ | $N_{24} = 1.4913$ | $V_{24} = 57.8$ |

The finder optical system of the real image type embodying the invention has a first focus, of the inverted subject, as indicated at 1a between objective lens 21 and front lens 22 of the erecting lens system, and has a second focus, of the erected subject, as indicated at 1b, between the rear lens 23 of the erecting lens system and the eyepiece 24. A small diaphragm 25 may be positioned at the center of the erecting lens system, or in the position of the entrance pupil in front of objective lens 21, so as to reduce magnification chromatic aberration caused by light rays other than the main light rays.

While a specific embodiment of the invention has been shown and described in detail to illustrate the application of the principles of the invention, it will be understood that the invention may be embodied otherwise without departing from such principles.

What is claimed is:

1. A finder optical system of the real image type comprising four identical non-spherical lenses consisting, in the direction of incident light rays therethrough, of an objective lens, a front lens of an erecting lens system, a rear lens of said erecting lens system, and an eyepiece; said lenses being arranged on a single common optical axis in spaced relation therealong, with the spacing between adjacent lenses being correlated with the optical functions of the respective lenses and corresponding to substantially twice the focal length of the respective lenses, each lens having the following parameters:

| | |
|---|---|
| Focal Length | 17.8 mm. |
| Diameter of Entrance Pupil | 2 mm $\phi$. |
| Radii of Curvature | $r_a = 20$ mm. |
| | $r_b = 15$ mm, $\epsilon b = -1.9$. |
| Lens Thickness | $d = 2$ mm. |
| Refractive Index with Respect to the d Line of Lens | $N = 1.4913$. |
| Abbe Number with Respect to the d Line of Lens | $V = 58.8$. |

2. A finder optical system of the real image type comprising four identical non-spherical lenses consisting, in the direction of incident light rays therethrough, of an objective lens, a front lens of an erecting lens system, a rear lens of said erecting lens system, and an eypeiece; said lenses being arranged on a single common optical axis in spaced relation therealong, with the spacing between adjacent lenses being correlated with the optical functions of the respective lenses, and corresponding to substantially twice the focal length of the respective lenses; the finder optical system having the following parameters:

| | |
|---|---|
| Magnification of the Finder | 1 |
| Entrance Pupil | 16.8 mm from the front surface of the objective lens. |
| Diameter of Entrance Pupil | 2 mm $\phi$. |
| Eyepoint | 16.8 mm from the rear surface of the eyepiece. |
| Radii of Curvature | $r_1$ to $r_8$ (stated below). |
| Coefficients of the Secondary Rotary Curved Surface | $\epsilon_2, \epsilon_3, \epsilon_6, \epsilon_7$ (Stated below). |
| Distances between Lens Surfaces on the Optical axis | $d_1$ to $d_7$ (stated below). |
| Refractive Indexes of the Lenses with Respect to the $d$ Line | $N_{21}$ to $N_{24}$ (Stated below). |
| Abbe Numbers of the Lenses with Respect to the d Line | $V_{21}$ to $V_{24}$ (Stated below). |

$r_1 = 20$ mm $\quad\quad\quad\quad\quad d_1 = 20$ mm $\quad N_{21} = 1.4913 \quad V_{21} = 57.8$ $r_2 = -15, \quad \epsilon_2 = -1.9 \quad d_2 = 34.2$ $r_3 = 15, \quad \epsilon_3 = -1.9 \quad d_3 = 2$ $\quad\quad\quad\quad\quad\quad\quad\quad\quad\quad\quad\quad N_{22} = 1.4913 \quad V_{22} = 57.8$ $r_4 = -20$ $r_5 = 20 \quad\quad\quad\quad\quad\quad d_4 = 33.5$ $\quad\quad\quad\quad\quad\quad\quad\quad\quad\quad d_5 = 2 \quad N_{23} = 1.4913 \quad V_{23} = 57.8$ $r_6 = -15, \quad \epsilon_6 = -1.9 \quad d_6 = 34.2$ $r_7 = 15, \quad\quad\quad\quad\quad\quad \epsilon_7 = -1.9$ $\quad\quad\quad\quad\quad\quad\quad\quad\quad\quad d_7 = 2 \quad N_{24} = 1.4913 \quad V_{24} = 57.8$ $r_8 = -20$

* * * * *